Figure 1:
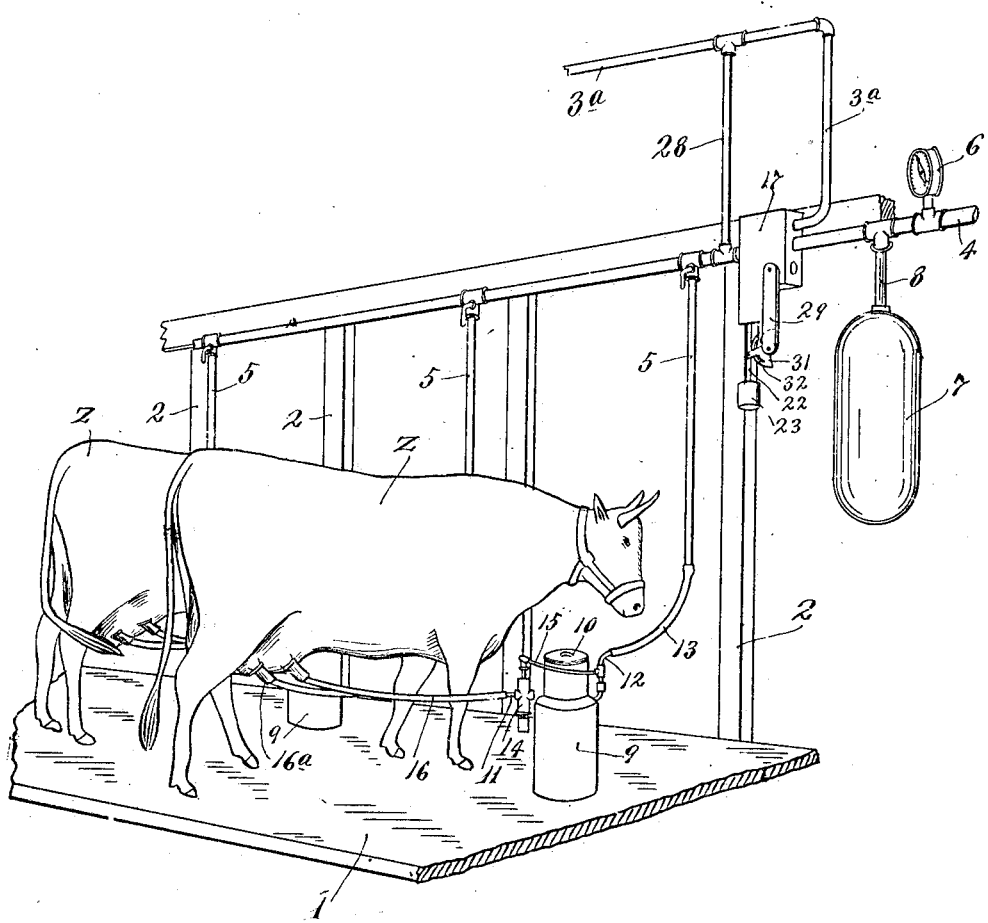

E. E. GOOD.
PULSATING DEVICE FOR MILKING APPARATUS.
APPLICATION FILED JAN. 27, 1910.

960,636.

Patented June 7, 1910.

2 SHEETS—SHEET 1.

Witnesses
A. H. Opsahl.
L. L. Simpson.

Inventor
Ezra E. Good
By his Attorneys
Williamson & Merchant

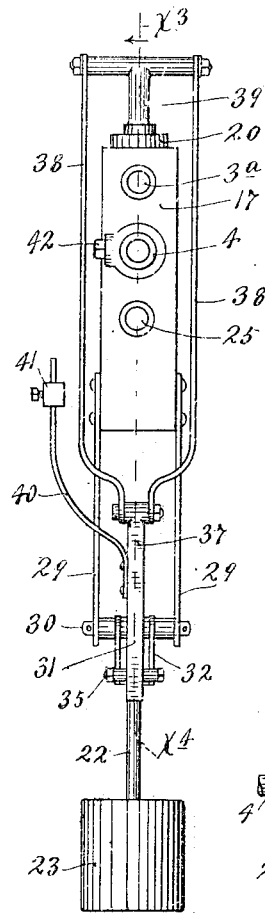
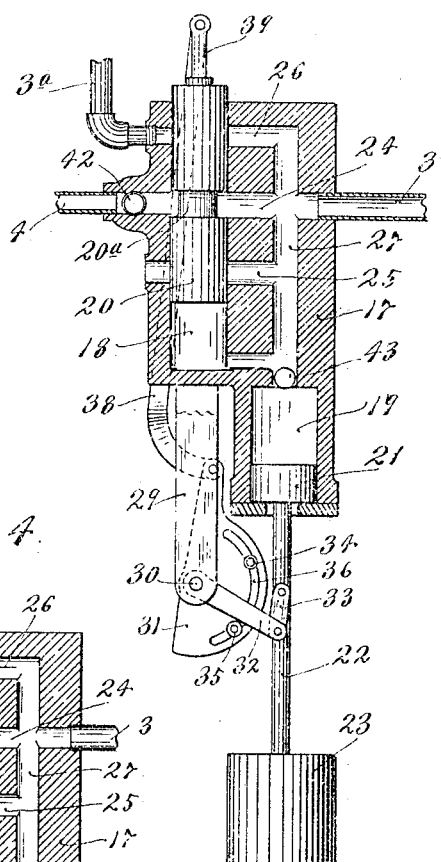
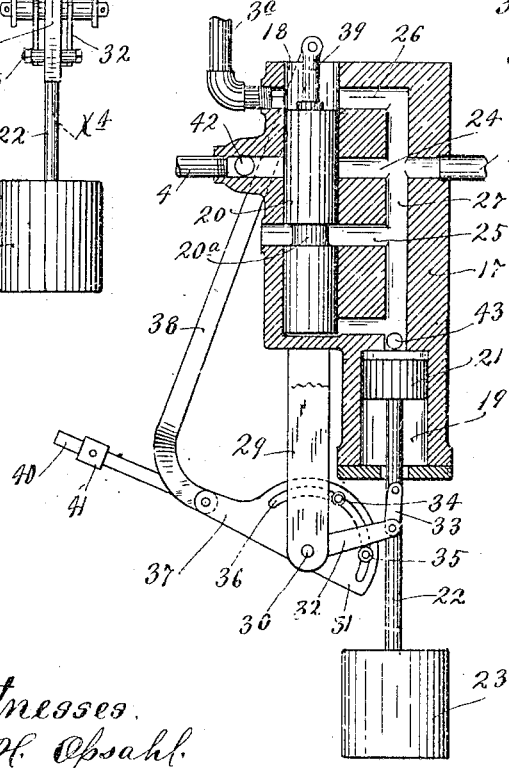

UNITED STATES PATENT OFFICE.

EZRA E. GOOD, OF WATERLOO, IOWA.

PULSATING DEVICE FOR MILKING APPARATUS.

960,636.  Specification of Letters Patent.  Patented June 7, 1910.

Application filed January 27, 1910. Serial No. 540,328.

*To all whom it may concern:*

Be it known that I, EZRA E. GOOD, a citizen of the United States, residing at Waterloo, in the county of Blackhawk and State of Iowa, have invented certain new and useful Improvements in Pulsating Devices for Milking Apparatus; and I do hereby declare the following to be a full, clear, and exact description of the invention, such as will enable others skilled in the art to which it appertains to make and use the same.

My invention relates to a mechanism for producing pulsations or variations in pressure in the service pipes and tubes of milking apparatus and it is in the nature of an improvement on the device disclosed and broadly claimed in my prior application, S. N. 451,492, filed September 3rd, 1908, entitled "Pulsating device for milking apparatus."

The invention consists of the novel devices and combinations of devices hereinafter described and defined in the claims.

In the accompanying drawings which illustrate the invention, like characters indicate like parts throughout the several views.

Referring to the drawings, Figure 1 is a perspective view showing the invention applied to a milking apparatus. Fig. 2 is a side elevation showing the improved pulsator removed from working position; and Figs. 3 and 4 are vertical sections taken approximately on the line $x^3$ $x^4$ of Fig. 2, showing different positions of the movable parts of said pulsator.

In Fig. 1, the numeral 1 indicates the floor and the numeral 2 stall posts rigidly secured thereto in the usual or any suitable way. The character $z$ indicates the cows within the stalls which are being milked by the improved apparatus.

The numerals 3 and 4 indicate what are herein designated respectively as the service pipe and pump pipe, the latter of which leads to a suitable air pump, not shown, by means of which a partial vacuum is produced in the various pipes and tubes of the milking apparatus. The service pipe 3 has valved branch pipes 5, of which there is shown one for each stall.

The numeral 6 indicates the vacuum gage applied to the pump pipe 4, and the numeral 7 indicates a reservoir which, as shown, is connected to the pump pipe 4 by a short depending pipe 8.

The numeral 9 indicates milk cans provided with removable covers 10 of the usual or any suitable construction which will make the said cans air tight when applied. As shown in the drawings, the improved pulsator is used in connection with a device as disclosed and claimed in my prior patent No. 937,789, issued of date October 28th, 1909, and entitled "milking apparatus," which device is applied to the cans and serves to prevent air from entering the cans when air is admitted into the service pipe and tubes of the system by the opening of the air vent of the pulsator. Of the parts of said improved can attachment, it is only desirable for the purpose of this case to note the air outlet or suction pipe 12 which extends from the can and, as shown, is connected by a flexible tube 13 to the lower end of the coöperating branch pipe 5; the milk inlet tube 11 which extends into the can 9 through a valve-controlled casing 14; and a by-passage 15, that connects the casing 14 with the suction pipe 12. The construction and operation of a check valve in the pipe 12, and of a valve mechanism in the casing 14, need not be herein considered, it being considered sufficient to state that, when the service vacuum or suction is increased in the service pipe 3, the branch pipe 5 and the tube 13, milk will be drawn into the can through flexible milk delivery tubes 16 and teat cups 16ª.

Directing attention to the improved pulsator, the numeral 17 indicates the casing thereof, preferably in the form of a cast block having an upper plunger valve seat 18 and a lower depending piston seat 19, which respectively are arranged to work in a plunger valve 20 and piston 21. The piston 21 is provided with a depending stem 22, at the lower end of which a weight 23 is attached. The valve seat 18 is transversely intersected by an intermediate port 24, a lower port 25 and an upper port 26. Within the valve casing 17 is an air conduit 27 that connects the inner extremities of the three ports 24, 25 and 26, and at its lower extremity opens into the lower end of the valve seat 18 and into the upper end of the piston seat 19. The outer extremity of the intermediate port 24 is connected to the pump pipe 4, while the intermediate portion of the air conduit is connected to one end of the service pipe 3. The outer extremity or portion is open to the atmosphere. The upper extremity of the port 26 is connected to one end of a secondary service pipe 3ª. The secondary service pipe 3ª is connected by a branch pipe 28 to the primary service pipe 3. The plunger valve 20 is provided with an intermediate annular port 20ª, which, when the said valve is in its uppermost position (as shown in Fig. 3), registers with and opens the port 24, and when the said valve is in its lowermost position (shown in Fig. 4), it registers with and opens the fresh air intake port 25.

To the casing 17 is secured a pair of laterally spaced depending hanger bars 29, to the lower ends of which, by means of a pin 30, a segmental head 31 and a bifurcated tripping lever 32 are independently pivoted. The bifurcated lever 32, as shown, is connected by short links 33 to the piston stem 22. The members of the lever 32 work between upper and lower stops 34 and 35 rigidly but adjustably secured, preferably, by nutted bolts, in a segmental slot 36 formed in the head 31. The said head 31 is provided with a projecting arm 37 which is pivotally connected to the lower end of a pair of laterally spaced links 38, the upper ends of which, as shown, are pivotally connected to a T-shaped bracket 39 rigidly secured to the upper end of the plunger valve 20. The arm 37 and the links 38 constitute a toggle connection between the plunger valve 20 and a support that is fixed relatively to the casing 17. A supplemental laterally bent arm 40 is rigidly secured to the oscillatory head 31 and is provided with an adjustable weight 41, the purpose of which will presently appear.

The port 24 is preferably provided with an adjustable choke valve in the form of a screw 42, and a similar choke valve or screw 43 is preferably applied in the connection between the piston seat 19 and the air conduit 27. These choke valves provide for the regulation of the flow of air through the respective ports, as required to properly time the pulsatory intervals.

What would be assumed, the normal position of the parts is shown in Fig. 3, and in this position, the ports 25 and 26 are closed while the port 24 is opened by the valve 20 and affords communication between the pump pipe 4 and the service pipe 3; and through the branch pipe 28, the secondary service pipe 3ª, as well as the primary service pipe 3, are subjected to the suction or partial vacuum produced in the said pump pipe 4. This suction or drawing action in the service pipes, of course, it will be understood, operates through the branch pipe 5 and the connected tubes of the milk cans to draw the milk from the teat cups into the cans.

When the suction or partial vacuum has been increased to a predetermined extent, the weighted piston 21 will be raised in its seat 19, and when it close approaches the limit of its uppermost movement, the lever 32 striking the upper stop 34 will throw the toggle 37—38 from its normally set or locked position slightly to the right of its dead center, toward a position slightly at the left of its dead center. When the plunger valve is in its upper position, shown in Fig. 3, and suction is effective on the weighted piston 21, the same suction is effective on the bottom of the plunger valve and exerts a downward drawing force thereon, so that the instant the toggle 37—38 is thrown to the left of its dead center (directions being taken in respect to Figs. 3 and 4), the said plunger valve will be instantly dropped to its lowermost position, shown in Fig. 4, thereby closing the port 24 and cutting off communication between the pump pipe 4 and the service pipes 3—3ª, and at the same time, letting air into the said service pipes and into the piston seat 19 through the conduit 27, the port 25, the port 26 and the upper extremity of the piston seat 18. This, as is evident, quickly decreases the suction in the said service pipes, as required to produce a releasing pulsation, and also decreases the suction or vacuum in the piston seat 19. When the suction in the piston seat 19 is decreased to a certain desired extent, the weighted piston 21 will drop by gravity back to its normal position, and at the limit of its downward movement, the lever 32 will engage the lower stop 35 of the head 31, thereby forcing the toggle 37—38 back to its locked position and the plunger valve 20 to its raised or normal position, shown in Fig. 3. When the valve 20 is lowered and the weighted piston 21 is raised, as shown in Fig. 4, the lower stop 35 of the head 31 is in close engagement with the lever 32, and the weight 41 on the arm 40 co-acts with the weight of the valve 20 and tends to resist the downward movement of the said weighted piston 21. The weight 23, however, is such that it will overcome the forces above noted and the weight 41 may be set, so that the said weighted piston 21 will become active to restore or raise the valve 20 whenever the suction or vacuum has been decreased to an extent which will give the proper timing and variation in pressure or suction action of the pulsations.

What I claim is:

1. In a milking apparatus, a pulsator comprising a casing connected between the service and pump pipes of said apparatus, an air vent leading to said service pipe, a valve normally closing said air vent and opening communication between said service and pump pipes, and which valve is normally subject to the drawing force or partial vacuum in said system, and a controller subject to varying pressure from within said service pipe and provided with connections for moving said valve and for holding the same in its normal position, substantially as described.

2. In a milking apparatus, a pulsator comprising a casing connected between the service and pump pipes of said apparatus, an air vent in said casing leading to said service pipe, a valve normally closing said air vent and opening communication between said service and pump pipes, the said valve at its lower end being subject to suction or partial vacuum in said pump pipe, a toggle-acting connection normally holding said valve in its raised or normal position, and a controller subject to varying pressure from within said service pipe and operative on said toggle connection to effect movements of said valve, substantially as described.

3. A pulsating device, comprising a casing having a piston seat and a plunger valve seat, an air conduit connecting said pump and service pipes through said casing and leading to the upper end of said piston seat and the lower end of said plunger valve seat, an air vent leading into said air conduit through said plunger valve seat, a plunger valve working in said plunger valve seat, normally closing said air vent but connecting said pump and service pipes, which valve is movable into position to open said air vent and cut off communication between said pump and service pipes, and a controller with connections for effecting movements of said valve, subject to varying pressure from within said service pipe, substantially as described.

4. In a milking apparatus, the combination with a pump pipe and a plurality of service pipes, of a pulsating device comprising a casing connected between said pump pipe and service pipes, an air vent in said casing leading to said two service pipes, a valve normally closing said air vent and connecting said pump pipe to said service pipes, which valve is movable in position to open said air vent to both service pipes and to cut off communication between said pump and service pipes, and a controller with connections for effecting movements of said valve, itself subject to varying pressure from within said service pipes, substantially as described.

In testimony whereof I affix my signature in presence of two witnesses.

EZRA E. GOOD.

Witnesses:
F. D. MERCHANT,
HARRY D. KILGORE.